US007489365B2

(12) United States Patent
Kim et al.

(10) Patent No.: US 7,489,365 B2
(45) Date of Patent: Feb. 10, 2009

(54) DRIVING A PANEL

(75) Inventors: Tae-Seong Kim, Asan-si (KR); Woo-Joon Chung, Asan-si (KR); Jin-Sung Kim, Cheonan-si (KR); Seung-Hun Chae, Suwon-si (KR); Kyoung-Ho Kang, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 497 days.

(21) Appl. No.: 10/958,638

(22) Filed: Oct. 6, 2004

(65) Prior Publication Data

US 2005/0083442 A1 Apr. 21, 2005

(30) Foreign Application Priority Data

Oct. 15, 2003 (KR) ...................... 10-2003-0071883

(51) Int. Cl.
*H04N 5/66* (2006.01)

(52) U.S. Cl. ........................ 348/797; 348/792; 348/800

(58) Field of Classification Search ................. 348/797, 348/792, 800; 345/60, 63, 66, 68; 315/169.4, 315/169.1, 169.3; *H04N 5/66*
See application file for complete search history.

(56) References Cited

U.S. PATENT DOCUMENTS

| | | | | |
|---|---|---|---|---|
| 5,541,618 | A | 7/1996 | Shinoda | |
| 6,512,501 | B1 * | 1/2003 | Nagaoka et al. | 345/66 |
| 6,653,993 | B1 * | 11/2003 | Nagao et al. | 345/60 |
| 6,670,774 | B2 * | 12/2003 | Son et al. | 315/169.4 |
| 6,724,357 | B2 * | 4/2004 | Kim et al. | 345/60 |
| 6,809,708 | B2 * | 10/2004 | Kanazawa et al. | 345/68 |
| 7,173,578 | B2 * | 2/2007 | Kim et al. | 345/60 |

* cited by examiner

*Primary Examiner*—Trang U Tran
(74) *Attorney, Agent, or Firm*—Robert E. Bushnell, Esq.

(57) ABSTRACT

A panel driving method in which a single TV field includes at least one reset period and at least one subfield and each of the at least one subfields includes an address period and a sustain period, includes supplying a variable reset pulse according to the length of a pause period in a previous or present TV field. A variable reset period is supplied according to the length of a pause period in a single TV field, so that a reset operation for preparing the address period is stably performed.

8 Claims, 10 Drawing Sheets

DRIVING A PANEL

CLAIM OF PRIORITY

This application makes reference to, incorporates the same herein, and claims all benefits accruing under 35 U.S.C. §119 from an application for PANEL DRIVING METHOD earlier filed in the Korean Intellectual Property Office on Oct. 15, 2003 and there duly assigned Ser. No. 2003-71883.

BACKGROUND OF THE INVENTION

1. Field of the Invention

The present invention relates to driving a panel, such as a Plasma Display Panel (PDP), and more particularly, to a panel driving method with an improved reset period and a program storage device, readable by a machine, tangibly embodying a program of instructions executable by the machine to perform the panel driving method with an improved reset period.

2. Description of the Related Art

In a single cell of a PDP, address electrode lines $A_1$, $A_2$, . . . $A_m$, dielectric layers, Y-electrode lines $Y_1$, . . . , $Y_n$, X-electrode lines $X_1$, . . . , $X_n$, phosphor layers, barrier walls, and a protective layer, for example, a magnesium oxide (MgO) layer, are provided between a front glass substrate and a rear glass substrate of the surface discharge PDP.

The address electrode lines $A_1$ through Am are formed on the front surface of the rear glass substrate in a predetermined pattern. A rear dielectric layer is formed on the surface of the rear glass substrate having the address electrode lines $A_1$ through $A_m$. The barrier walls are formed on the front surface of the rear dielectric layer parallel to the address electrode lines A1 through Am. The barrier walls partition discharge regions of respective display cell and serve to prevent cross talk between display cells. The phosphor layers are formed between the barrier walls.

The X-electrode lines $X_1$ through $X_n$ and the Y-electrode lines $Y_1$ through $Y_n$ are formed on the rear surface of the front glass substrate in a predetermined pattern to be orthogonal to the address electrode lines $A_1$ through $A_m$. The respective intersections define display cells. Each of the X-electrode lines $X_1$ through $X_n$ can include a transparent electrode line $X_{na}$ formed of a transparent conductive material, e.g., Indium Tin Oxide (ITO), and a metal electrode line $X_{nb}$ for increasing conductivity. Each of the Y-electrode lines $Y_1$, $Y_2$, . . . , Yn can include a transparent electrode line $Y_{na}$ formed of a transparent conductive material, e.g., ITO, and a metal electrode line $Y_{nb}$ for increasing conductivity. A front dielectric layer is deposited on the entire rear surface of the front glass substrate having the rear surfaces of the X-electrode lines X1, X2, . . . , $X_n$ and the Y-electrode lines $Y_1$, $Y_2$, . . . , $Y_n$. The protective layer, e.g., a MgO layer, for protecting the panel against a strong electrical field, is deposited on the entire rear surface of the front dielectric layer. A gas for forming a plasma is hermetically sealed in a discharge space.

In driving such PDP, usually, reset step, address step, and sustain step are sequentially performed in each subfield. In reset step, charges are uniformized in display cells to be driven. In address step, a charge state of display cells to be selected and a charge state of display cells to be unselected are set up. In sustain step, a display discharge occurs in the selected display cells. A plasma is produced from the plasma forming gas in the display cells where the display discharge occurs. The plasma emits ultraviolet rays exciting the phosphor layers in the display cells, so that light is emitted.

An address-display separation driving method for the PDP having such a structure is discussed in U.S. Pat. No. 5,541,618.

A driving apparatus for the PDP discussed above includes an image processor, a logic controller, an address driver, an X-driver, and a Y-driver. The image processor converts an I l external analog image signal into a digital signal to generate an internal image signal, for example, 8-bit red (R) video data, 8-bit green (G) video data, and 8-bit blue (B) video data, a clock signal, a vertical synchronizing signal, and a horizontal synchronizing signals. The logic controller generates drive control signals $S_a$, $S_y$, and $S_x$ in response to the internal image signals from the image processor. The address driving unit processes the address signal $S_A$ among the drive control signals $S_A$, $S_Y$, and $S_X$ output from the logic controller to generate a display data signal and applies the display data signal to address electrode lines. The X-driver processes the X-drive control signal $S_X$ among the drive control signals $S_A$, $S_Y$, and $S_X$ output from the logic controller and applies the result of processing to X-electrode lines. The Y-driver processes the Y-drive control signal $S_Y$ among the drive control signals $S_A$, $S_Y$, and $S_X$ output from the logic controller 302 and applies the result of processing to Y-electrode lines.

With respect to Y-electrode lines of the PDP discussed above, to realize a time-division grayscale display, a unit frame can be divided into a predetermined number of subfields, e.g., 8 subfields SF1, SF2, . . . , SF8. In addition, the individual subfields SF1 through SF8 are composed of reset periods (not shown), respectively, address periods $A_1$, $A_2$, . . . , $A_8$, and sustain periods $S_1$, $S_2$, . . . , $S_8$, respectively.

During each of the address periods $A_1$ through $A_8$, display data signals are supplied to address electrode lines $A_1$ through $A_m$ and simultaneously, a scan pulse is sequentially supplied to the Y-electrode lines $Y_1$ through $Y_n$.

During each of the sustain periods $S_1$ through $S_8$, a pulse for display discharge is alternately supplied to the Y-electrode lines $Y_1$ through $Y_n$ and the X-electrode lines $X_1$ through $X_n$, thereby provoking display discharge in discharge cells in which wall charges are induced during each of the address periods $A_1$ through $A_8$.

The luminance of the PDP is proportional to a total length of the sustain periods $S_1$ through $S_8$ in a unit frame. When a unit frame forming a single image is expressed by 8 subfields and 256 grayscales, different numbers of sustain pulses can be allocated to the respective subfields at a ratio of 1:2:4:8:16:32:64:128. Luminance corresponding to 133 grayscales can be obtained by addressing cells and sustaining a discharge during a first subfield SF1, a third subfield SF3, and an eighth subfield SF8.

A sustain period allocated to each subfield can be variably determined depending upon weights, which are supplied to the respective subfields according to an Automatic Power Control (APC) level, and can be variously changed taking account of gamma characteristics or panel characteristics. For example, a grayscale level allocated to a fourth subfield SF4 can be lowered from 8 to 6, while a grayscale level allocated to a sixth subfield SF6 can be increased from 32 to 34. In addition, the number of subfields constituting a single frame can be variously changed according to design specifications.

A single subfield SF of an Alternating Current (AC) PDP includes a reset period PR, an address period PA, and a sustain period PS.

During the reset period PR, a reset pulse is supplied to all of the scan electrodes $Y_1$ through $Y_n$, thereby initializing a state of wall charges in each cell. The reset period PR is performed before entering the address period PA. The reset period PR is provided prior to the address period PA. Since the initialization is performed throughout the PDP1 during the reset period PR, highly uniform and desirable distribution of wall charges can be obtained. The cells initialized during the reset period PR have similar wall charge conditions to one another. The reset period PR is followed by the address period PA. During the address period PA, a bias voltage $V_e$ is supplied to the common electrodes X, and the scan electrodes $Y_1$ through $Y_n$ and the address electrodes $A_1$ through $A_m$ corresponding to cells to be displayed are simultaneously turned on to select the cells. After the address period PA, a sustain pulse $V_s$ is alternately supplied to the common electrodes X and the scan electrodes $Y_1$ through $Y_n$ during the sustain period PS. During the sustain period PS, a voltage $V_G$ of a low level is supplied to the address electrodes $A_1$ through $A_m$.

During the reset period PR, a ramp rising period of the scan electrodes $Y_1$ through $Y_n$ is provided to minimize the length of visible rays emitted during a write discharge and facilitate initialization of cells.

In the PDP driving method discussed above, a single subfield SF includes a reset period PR, an address period PA, and a sustain period PS. However, there is also another panel driving method in which only some of a plurality of subfields constituting one TV field include a reset period PR to minimize visible rays during the write discharge. In this method, the single TV field includes at least one reset period PR and a plurality of subfields. A single subfield includes an address period PA and a sustain period PS. Also, a reset period PR having a constant time is supplied irrespective of the weight of the sustain period PS in a single TV field.

SUMMARY OF THE INVENTION

The present invention provides a panel driving method and a program storage device, l readable by a machine, tangibly embodying a program of instructions executable by the machine to perform the panel driving method, in which a reset period varies according to the length of a pause period in a single TV field.

According to an aspect of the present invention, a panel driving method is provided comprising: defining at least one reset period and at least one subfield in a single TV field, each of the at least one subfields including an address period and a sustain period; and generating a variable reset pulse according to a pause period length of a previous TV field or a present TV field.

A rising slope of a ramp of the variable reset pulse is preferably varied according to the pause period length of the previous TV field or present TV field.

A highest ramp voltage of the reset pulse is preferably varied according to the pause period length of the previous TV field or present TV field.

A ramp period of the reset pulse is preferably varied according to the length of the pause period of the previous TV field or present TV field.

The pause period length of the previous TV field or present TV field is preferably varied according to a number of sustain pulses of the previous TV field or present TV field.

The pause period length of the previous TV field or present TV field is preferably varied according to the number of subfields constituting one TV field.

According to another aspect of the present invention, a program storage device, readable by a machine, tangibly embodying a program of instructions executable by the machine to perform a panel driving method comprising: defining at least one reset period and at least one subfield in a single TV field, each of the at least one subfields including an address period and a sustain period; and generating a variable reset pulse according to a pause period length of a previous TV field or a present TV field.

A rising slope of a ramp of the variable reset pulse is preferably varied according to the pause period length of the previous TV field or present TV field.

A highest ramp voltage of the reset pulse is preferably varied according to the pause period length of the previous TV field or present TV field.

A ramp period of the reset pulse is preferably varied according to the length of the pause period of the previous TV field or present TV field.

The pause period length of the previous TV field or present TV field is preferably varied according to a number of sustain pulses of the previous TV field or present TV field.

The pause period length of the previous TV field or present TV field is preferably varied according to the number of subfields constituting one TV field.

BRIEF DESCRIPTION OF THE DRAWINGS

The above object and advantages of the present invention will become more apparent by describing in detail exemplary embodiments thereof with reference to the attached drawings in which.

DETAILED DESCRIPTION OF THE INVENTION

Figure 1:
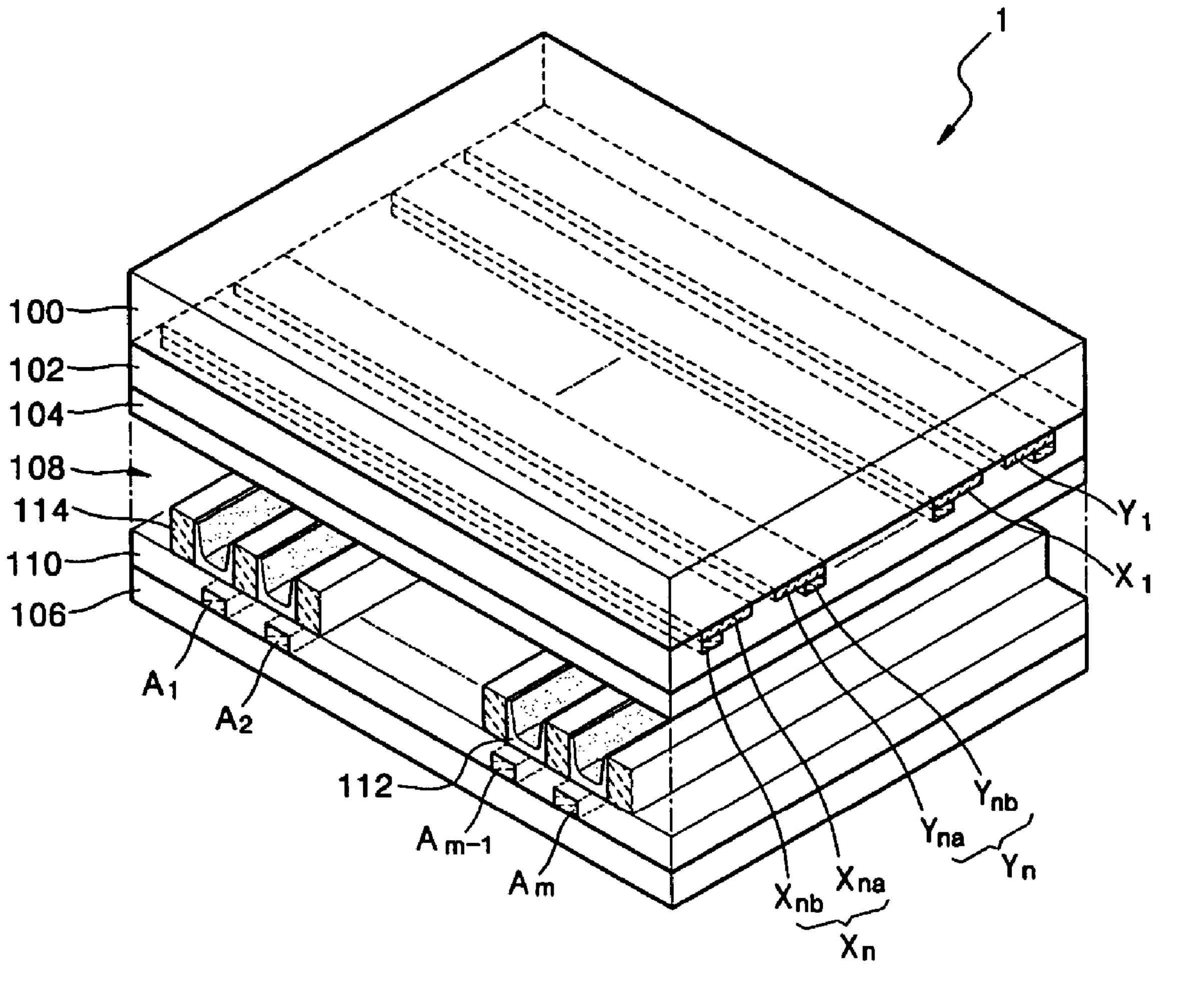
FIG. 1 is a view of the structure of a surface discharge type triode PDP.
Figure 2:
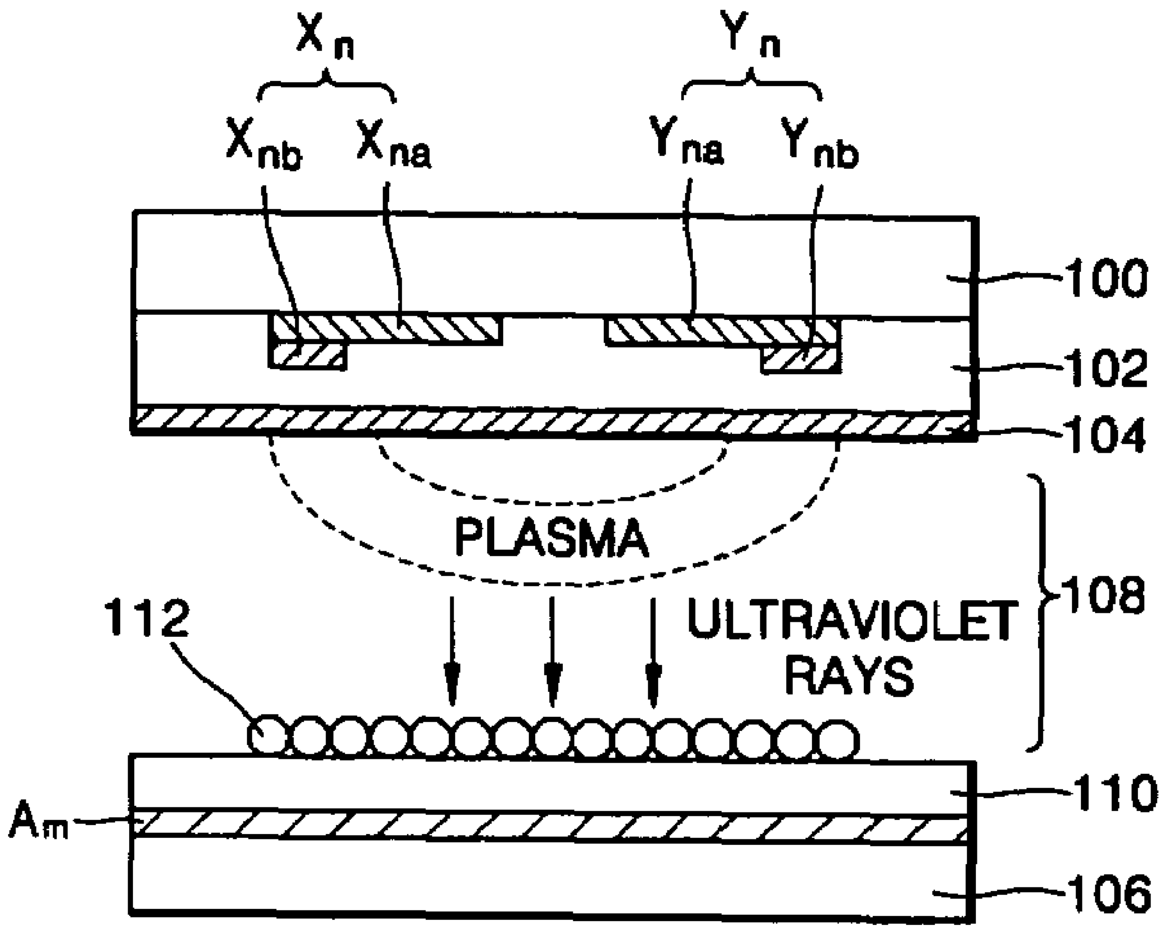
FIG. 2 is a view of an operation of a single cell of the PDP of FIG. 1.

FIG. 1 is a view of the structure of a surface discharge triode PDP, and FIG. 2 is a view of an operation of a single cell of the PDP of FIG. 1.

Referring to FIGS. 1 and 2, address electrode lines $A_1$, $A_2$, . . . , $A_m$, dielectric layers 102 and 110, Y-electrode lines $Y_1$, . . . , $Y_n$, X-electrode lines $X_1$, . . . , $X_n$, phosphor layers 112, barrier walls 114, and a protective layer 104, for example, a magnesium oxide (MgO) layer, are provided between a front glass substrate 100 and a rear glass substrate 106 of the surface discharge PDP 1.

The address electrode lines $A_1$ through Am are formed on the front surface of the rear glass substrate 106 in a predetermined pattern. A rear dielectric layer 110 is formed on the surface of the rear glass substrate 106 having the address electrode lines $A_1$ through $A_m$. The barrier walls 114 are formed on the front surface of the rear dielectric layer 110 parallel to the address electrode lines A1 through Am. The barrier walls 114 partition discharge regions of respective display cell and serve to prevent cross talk between display cells. The phosphor layers 112 are formed between the barrier walls 114;

The X-electrode lines $X_1$ through $X_n$ and the Y-electrode lines $Y_1$ through $Y_n$ are formed on the rear surface of the front glass substrate 100 in a predetermined pattern to be orthogonal to the address electrode lines $A_1$ through $A_m$. The respective intersections define display cells. Each of the X-electrode lines $X_1$ through $X_n$ can include a transparent electrode line $X_{na}$ formed of a transparent conductive material, e.g., Indium Tin Oxide (ITO), and a metal electrode line $X_{nb}$ for increasing conductivity. Each of the Y-electrode lines $Y_1, Y_2, \ldots,$ Yn can include a transparent electrode line Yna formed of a transparent conductive material, e.g., ITO, and a metal electrode line $Y_{nb}$ for increasing conductivity. A front dielectric layer 102 is deposited on the entire rear surface of the front glass substrate 100 having the rear surfaces of the X-electrode lines X1, X2, . . . , $X_n$ and the Y-electrode lines $Y_1, Y_2, \ldots Y_n$. The protective layer 104, e.g., a MgO layer, for protecting the panel 1 against a strong electrical field, is deposited on the entire rear surface of the front dielectric layer 102. A gas for forming a plasma is hermetically sealed in a discharge space 108.

In driving such a PDP, a reset step, an address step, and a sustain step are usually sequentially performed in each subfield. In the reset step, charges are made uniform in the display cells to be driven. In the address step, a charge state of the display cells to be selected and a charge state of the unselected display cells are set up. In the sustain step, a display discharge is performed in the selected display cells. A plasma is produced from the plasma forming gas in the display cells where the display discharge is occurring. The plasma emits ultraviolet rays exciting the phosphor layers 112 in the display cells, so that light is emitted.

Figure 3:
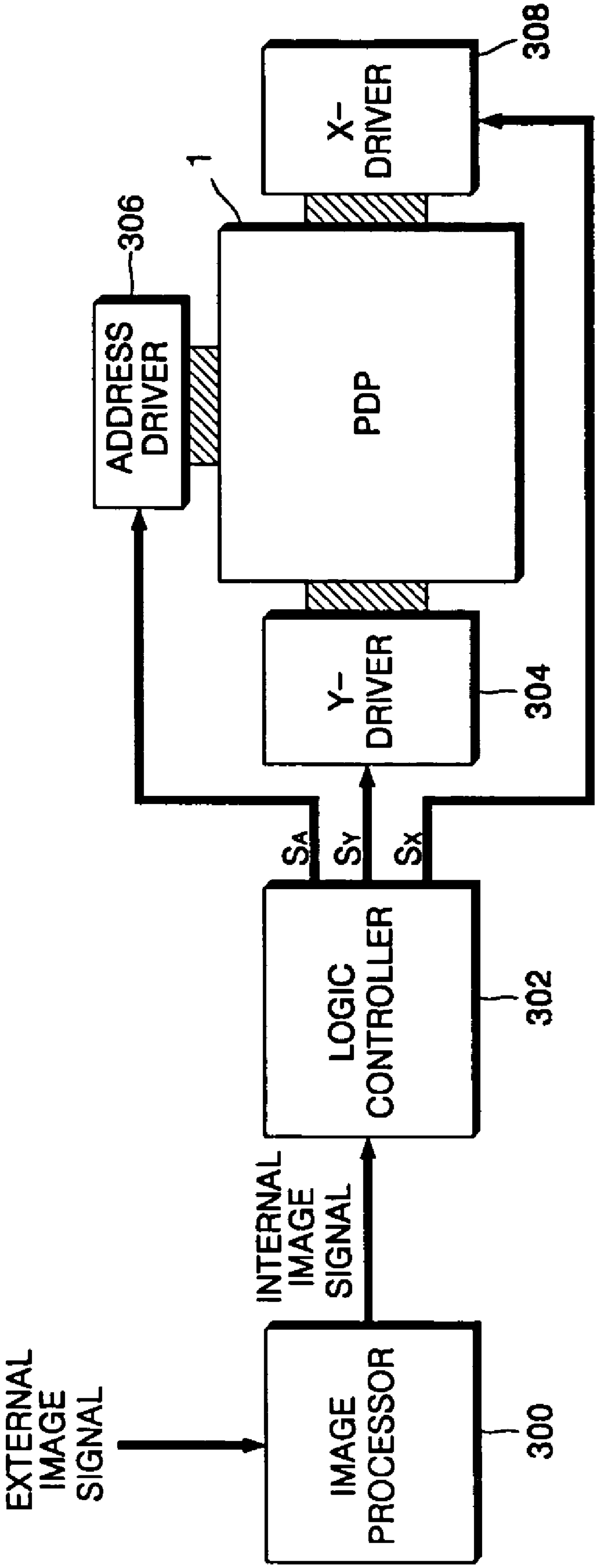
FIG. 3 is a view of a driving apparatus for the PDP of FIG. 1.

FIG. 3 is a view of a driving apparatus for the PDP of FIG. 1. Referring to FIG. 3, the driving apparatus for the PDP 1 includes an image processor 300, a logic controller 302, an address driver 306, an X-driver 308, and a Y-driver 304. The image processor 300 converts an external analog image signal into a digital signal to generate an internal image signal, for example, 8-bit red (R) video data, 8-bit green (G) video data, and 8-bit blue (B) video data, a clock signal, a vertical synchronizing signal, and a horizontal synchronizing signals. The logic controller 302 generates drive control signals $S_a$, $S_y$ and $S_x$ in response to the internal image signals from the image processor 300. The address driving unit 306 processes the address signal $S_A$ among the drive control signals $S_A$, $S_Y$, and $S_X$ output from the logic controller 302 to generate a display data signal and supplies the display data signal to the address electrode lines. The X-driver 308 processes the X-drive control signal $S_X$ among the drive control signals $S_A$, $S_Y$, and $S_X$ output from the logic controller 302 and supplies the result of the processing to X-electrode lines. The Y-driver 304 processes the Y-drive control signal $S_Y$ among the drive control signals $S_A$, $S_Y$, and $S_X$ output from the logic controller 302 and supplies the result of the processing to Y-electrode lines.

Figure 4:
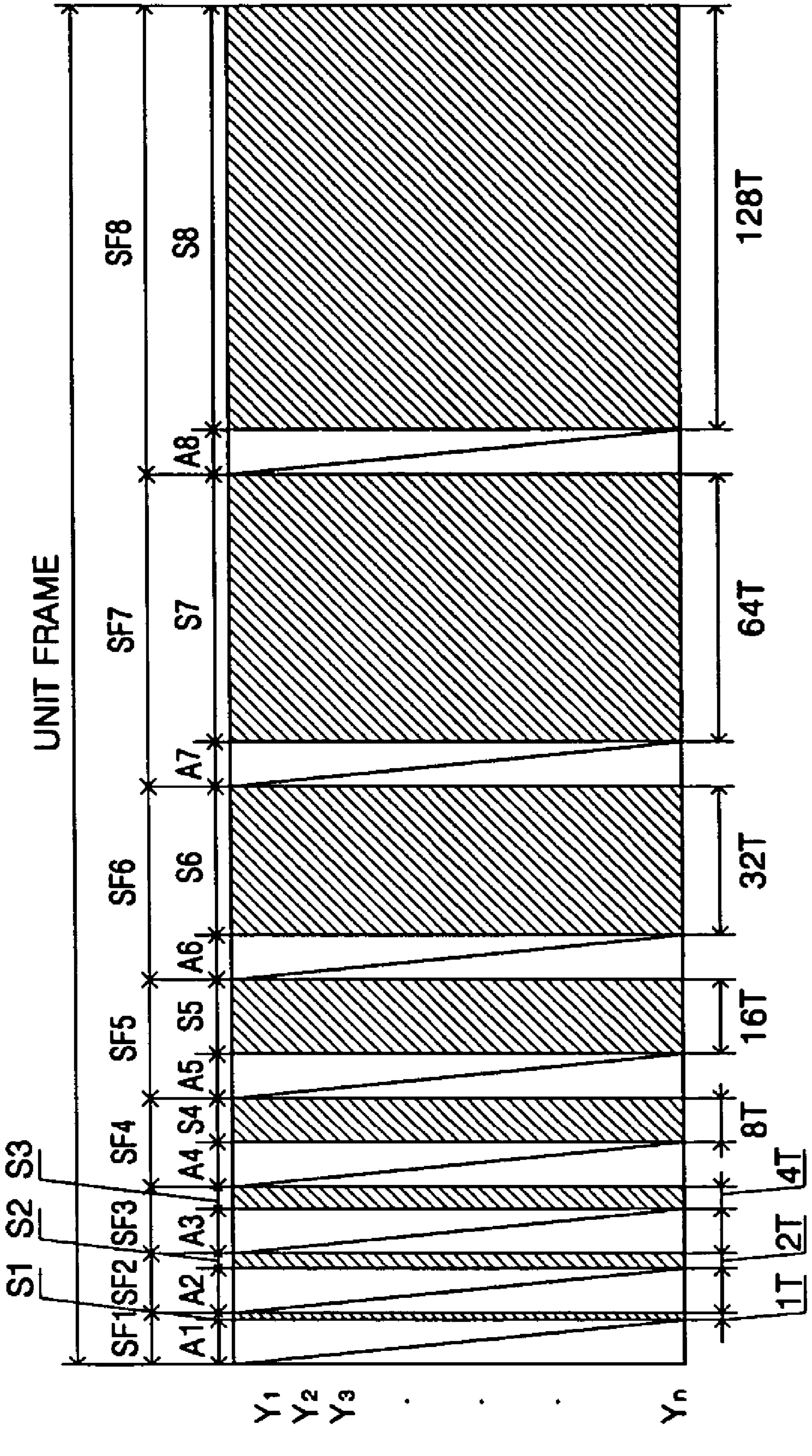
FIG. 4 is a view of an address-display separation driving method with respect to the Y-electrode lines of the PDP 1 of FIG. 1.

FIG. 4 is a view of an address-display separation driving method with respect to Y-electrode lines of the PDP 1 of FIG. 1. Referring to FIG. 4, to realize a time-division grayscale display, a unit frame is divided into a predetermined number of subfields, e.g., 8 subfields SF1, SF2, . . . , SF8. In addition, the individual subfields SF1 through SF8 are composed of reset periods (not shown), respectively, address periods $A_1$, $A_2, \ldots, A_8$, and sustain periods $S_1, S_2, \ldots, S_8$, respectively.

During each of the address periods $A_1$ through $A_8$, display data signals are supplied to address electrode lines $A_1$ through $A_m$ of FIG. 1 and simultaneously, a scan pulse is sequentially supplied to the Y-electrode lines $Y_1$ through $Y_n$.

During each of the sustain periods $S_1$ through $S_8$, a pulse for display discharge is alternately supplied to the Y-electrode lines $Y_1$ through $Y_n$ and the X-electrode lines $X_1$ through $X_n$, thereby initiating a display discharge in discharge cells in which wall charges are induced during each of the address periods $A_1$ through $A_8$.

The luminance of the PDP 1 is proportional to a total length of the sustain periods $S_1$ through $S_8$ in a unit frame. When a unit frame forming a single image is expressed by 8 subfields and 256 grayscales, a different numbers of sustain pulses can be allocated to the respective subfields at a ratio of 1:2:4:8:16:32:64:128. Luminance corresponding to 133 grayscales can be obtained by addressing cells and sustaining a discharge during a first subfield SF1, a third subfield SF3, and an eighth subfield SF8.

A sustain period allocated to each subfield can be variably determined depending upon weights, which are supplied to the respective subfields according to an Automatic Power Control (APC) level, and can be variously changed taking account of gamma characteristics or panel characteristics. For example, a grayscale level allocated to a fourth subfield SF4 can be lowered from 8 to 6, while a grayscale level allocated to a sixth subfield SF6 can be increased from 32 to 34. In addition, the number of subfields constituting a single frame can be changed according to design specifications.

Figure 5:
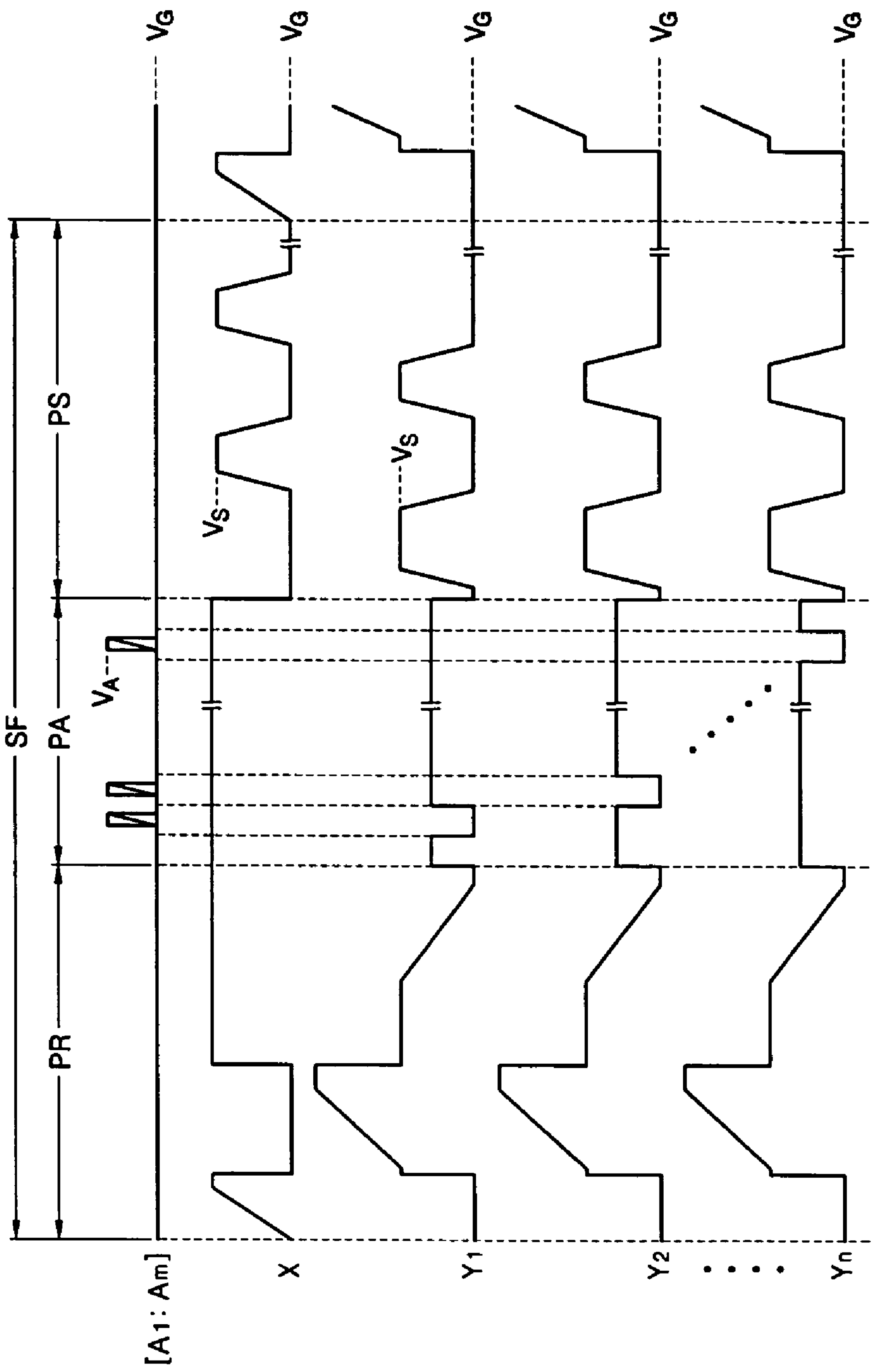
FIG. 5 is a timing chart of examples of driving signals used in the PDP 1 of FIG. 1.

FIG. 5 is a timing chart of examples of driving signals used in the PDP 1 of FIG. 1. In other words, FIG. 5 illustrates driving signal supplied to address electrodes $A_1$ through $A_m$, common electrodes X, and scan electrodes $Y_1$ through $Y_n$ during a single subfield SF in an Address Display Separated (ADS) driving method of an Alternating Current (AC) PDP. Referring to FIG. 5, the single subfield SF includes a reset period PR, an address period PA, and a sustain period PS.

During the reset period PR, a reset pulse is supplied to all of the scan electrodes $Y_1$ through $Y_n$, thereby initializing a state of the wall charges in each cell. The reset period PR occurs before entering the address period PA. The reset period PR occurs prior to the address period PA. Since the initialization is performed throughout the PDP 1 during the reset period PR, a highly uniform and desirable distribution of wall charges can be obtained. The cells initialized during the reset period PR have similar wall charge conditions. The reset period PR is followed by the address period PA. During the address period PA, a bias voltage $V_e$ is supplied to the common electrodes X, and the scan electrodes $Y_1$ through $Y_n$ and the address electrodes $A_1$ through $A_m$ corresponding to cells to be displayed are simultaneously turned on to select the cells. After the address period PA, a sustain pulse $V_s$ is alternately supplied to the common electrodes X and the scan electrodes $Y_1$ through $Y_n$ during the sustain period PS. During the sustain period PS, a low level voltage $V_G$ is supplied to the address electrodes $A_1$ through $A_m$.

During the reset period PR of FIG. 5, a rising ramp period of the scan electrodes $Y_1$ through $Y_n$ is provided to minimize the length of visible rays emitted during a write discharge and to facilitate initialization of the cells.

Although FIG. 5 is a view of an example of a PDP driving method in which a single subfield SF includes a reset period PR, an address period PA, and a sustain period PS, there is also another panel driving method in which only some of a plurality of subfields constituting one TV field include a reset period PR to minimize visible rays during the write discharge. In this method, the single TV field includes at least one reset period PR and a plurality of subfields. A single subfield includes an address period PA and a sustain period PS. Also, a reset period PR having a constant time is supplied irrespective of the weight of the sustain period PS in a single TV field.

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components.

Since a PDP has driving characteristics including a high power dissipation, it is necessary to control power dissipation according to a load factor or Average Signal Level (ASL). The load factor is a ratio of the number of discharge cells sustaining a discharge to the total number of all of the discharge cells (or display cells). The ASL is obtained by calculating the average luminance of input image signals in respective discharge cells. To control the power dissipation, the load factor or the ASL is anticipated for each frame and the number of sustain discharges corresponding to the load factor or the ASL is controlled by Automatic Power Control (APC).

Figure 6:
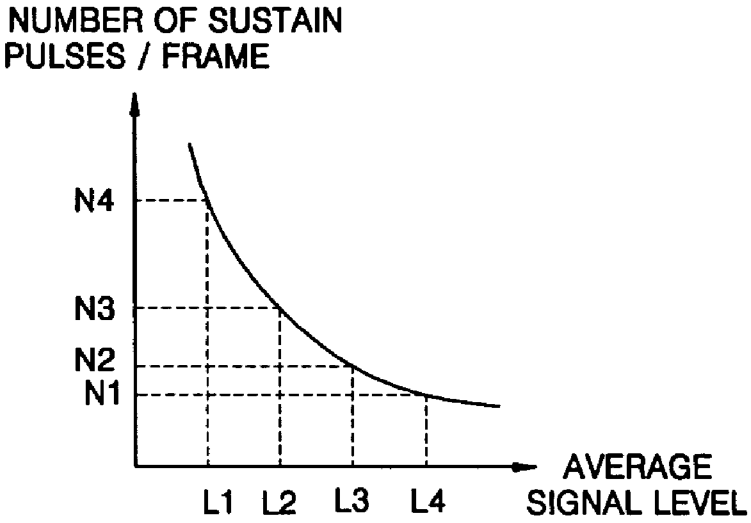
FIG. 6 is a graph of the operating principle of the APC according to an ASL in a PDP.

FIG. 6 is a graph of the operating principle of the APC according to the ASL in a PDP. Although the APC of FIG. 6 includes only 4 steps for clarity of explanation, the APC can include a greater number of steps than 4 using a Lookup Table (LUT).

Referring to FIG. 6, the greatest number of sustain discharges, i.e., N4, was supplied when the ASL was 0 to L1. In a range where the ASL was between L1 and L2, N3 was supplied. In a range where the ASL was between L2 and L3, N2 was supplied. Also, when the ASL was more than L3, the smallest number of sustain discharges, i.e., N1, was supplied.

Figure 7:
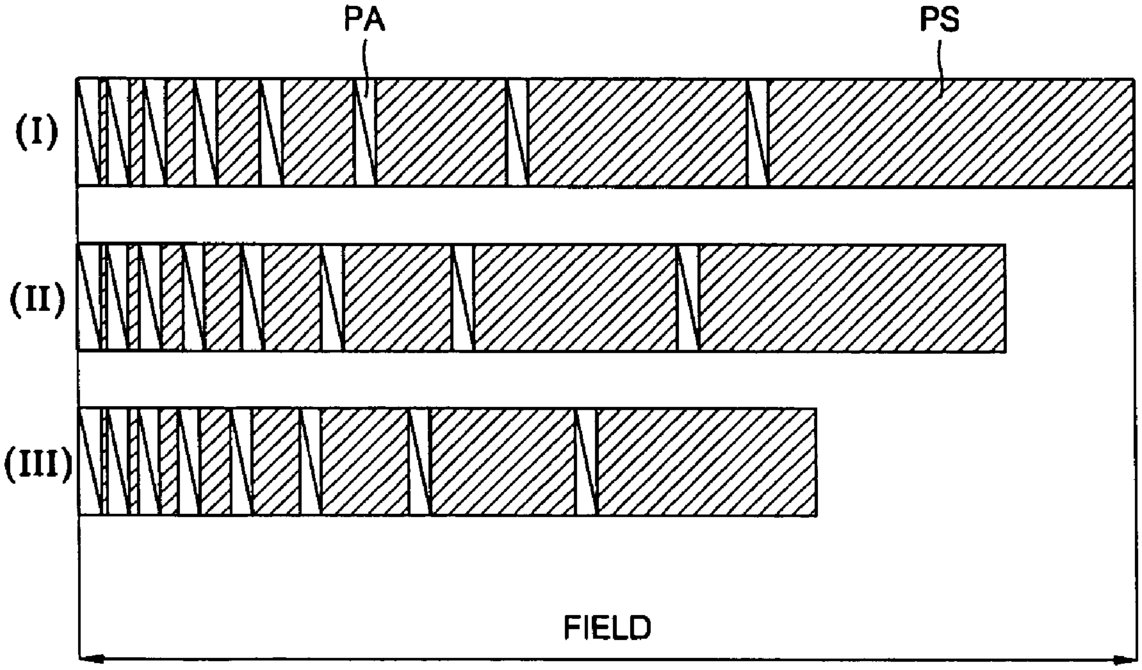
FIG. 7 is a view of a method of embodying grayscales of a PDP using APC according to an ASL.

FIG. 7 is a view of a method of embodying grayscales of a PDP using APC according to ASL.

Referring to FIG. 7, the APC includes three steps I, II, and III for clarity of explanation. However, the APC can include more than 3 steps, for example, 128 or 256 steps. In step I where the ASL of an externally input image signal was low, an image was generally dark. In step III where the ASL of an externally input image signal was high, an image was generally bright. To reduce the high power dissipation, the entire time taken to generate a discharge is shortened by reducing a sustain period.

As shown in FIG. 7, a sustain period allocated to each subfield can be variably determined depending upon weights, which are supplied to subfields according to APC steps. Thus, a length of a pause period in a single TV field can be changed according to APC steps.

The sustain period allocated to each subfield can be changed taking gamma characteristics or panel characteristics into account. Also, the number of subfields constituting a single frame can be increased or decreased according to design specifications. The length of the pause period can be changed according to not only a variation of APC steps but also to a variation of the sustain period or a variation of the number of subfields in the same concept as shown in FIG. 7.

The present invention is supplies a variable reset pulse according to a length of the pause period in a single TV field.

Figure 8:
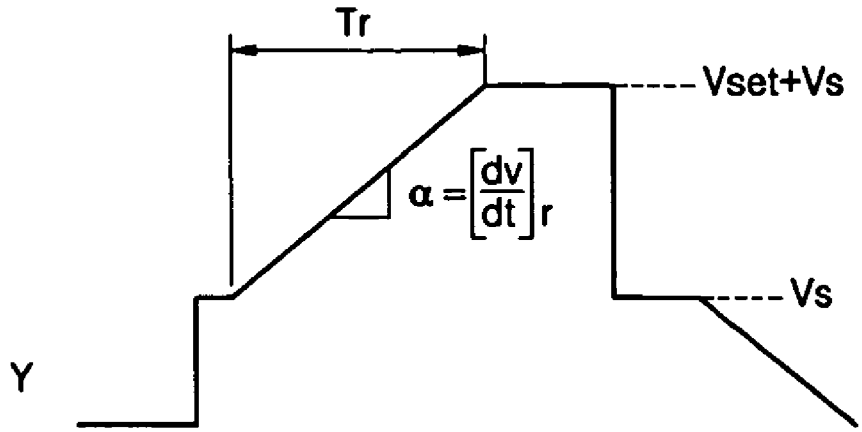
FIG. 8 is a waveform diagram of elements of a reset pulse, the elements being varied according to the foregoing pause period.

FIG. 8 is a waveform diagram of elements of the reset pulse, which can be varied according to the foregoing pause period. Ramp characteristics of the reset pulse can be determined according to a ramp risetime (Tr), a ramp voltage (Vset), and a ramp slope α. The ramp slope α can be expressed as shown in Equation 1.

$$\alpha = \left[\frac{dv}{dt}\right]_r = \frac{V_{set}}{T_r} \quad (1)$$

Figure 9:
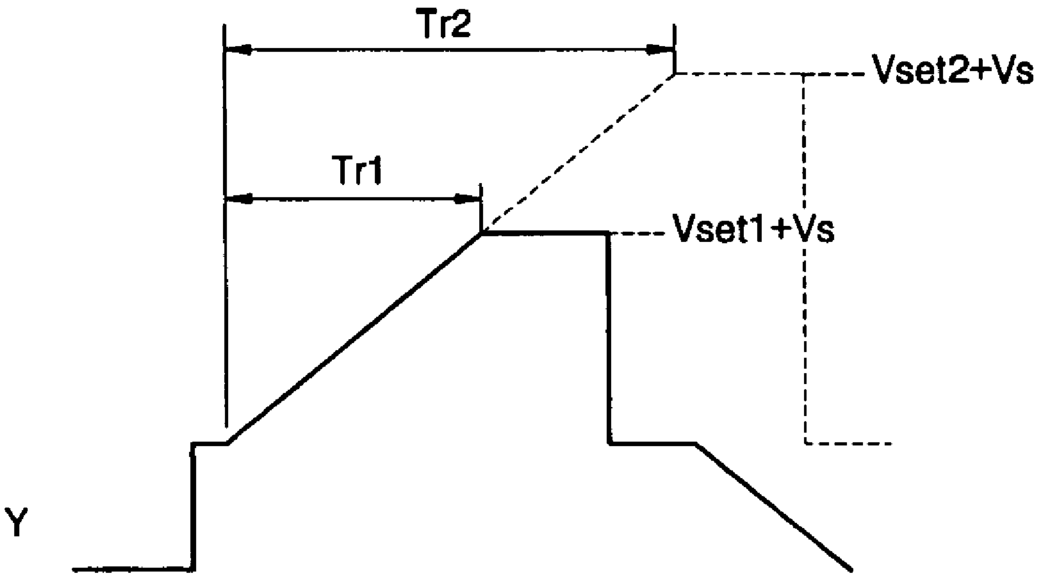
FIG. 9 is a view of an example where only a ramp risetime among the variable elements of the reset pulse of FIG. 8 is varied.

FIG. 9 is a view of an example where only the ramp risetime is varied among the variable elements of the reset pulse shown in FIG. 8. When the ramp slope was fixed and the ramp risetime was increased from Tr1 to Tr2, the ramp voltage increased from Vset1 to Vset2.

Figure 10:
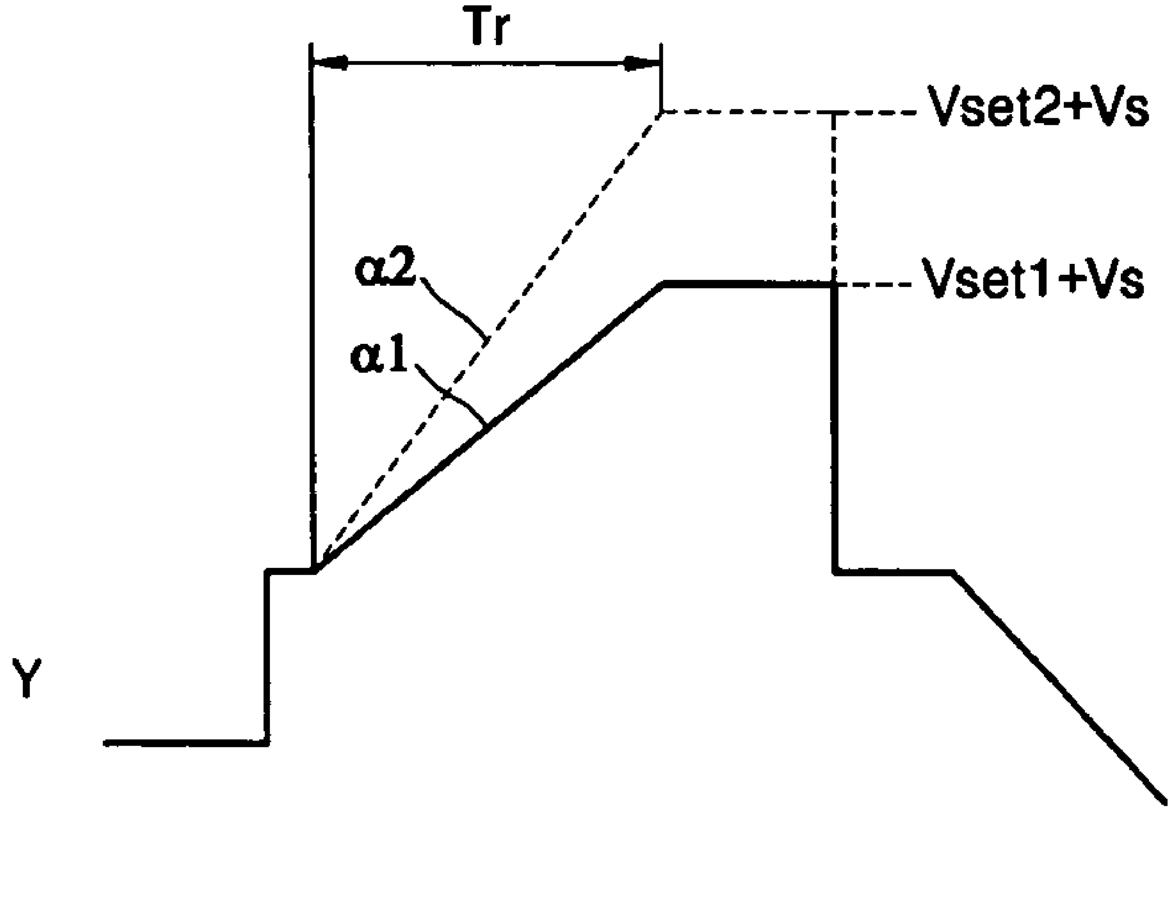
FIG. 10 is a view of an example where a ramp risetime is maintained at a value Tr and the ramp voltage or ramp slope is varied.

FIG. 10 is a view of an example where the ramp risetime is maintained at Tr and the ramp voltage or ramp slope is varied. When the ramp risetime was fixed and the ramp slope was increased from $\alpha_1$ to $\alpha_2$, the ramp voltage increased from Vset1 to Vset2. Inversely, when the ramp risetime was fixed and the ramp voltage was increased from Vset1 to Vset2, the ramp slope increased from $\alpha_1$ to $\alpha_2$.

Figure 11:
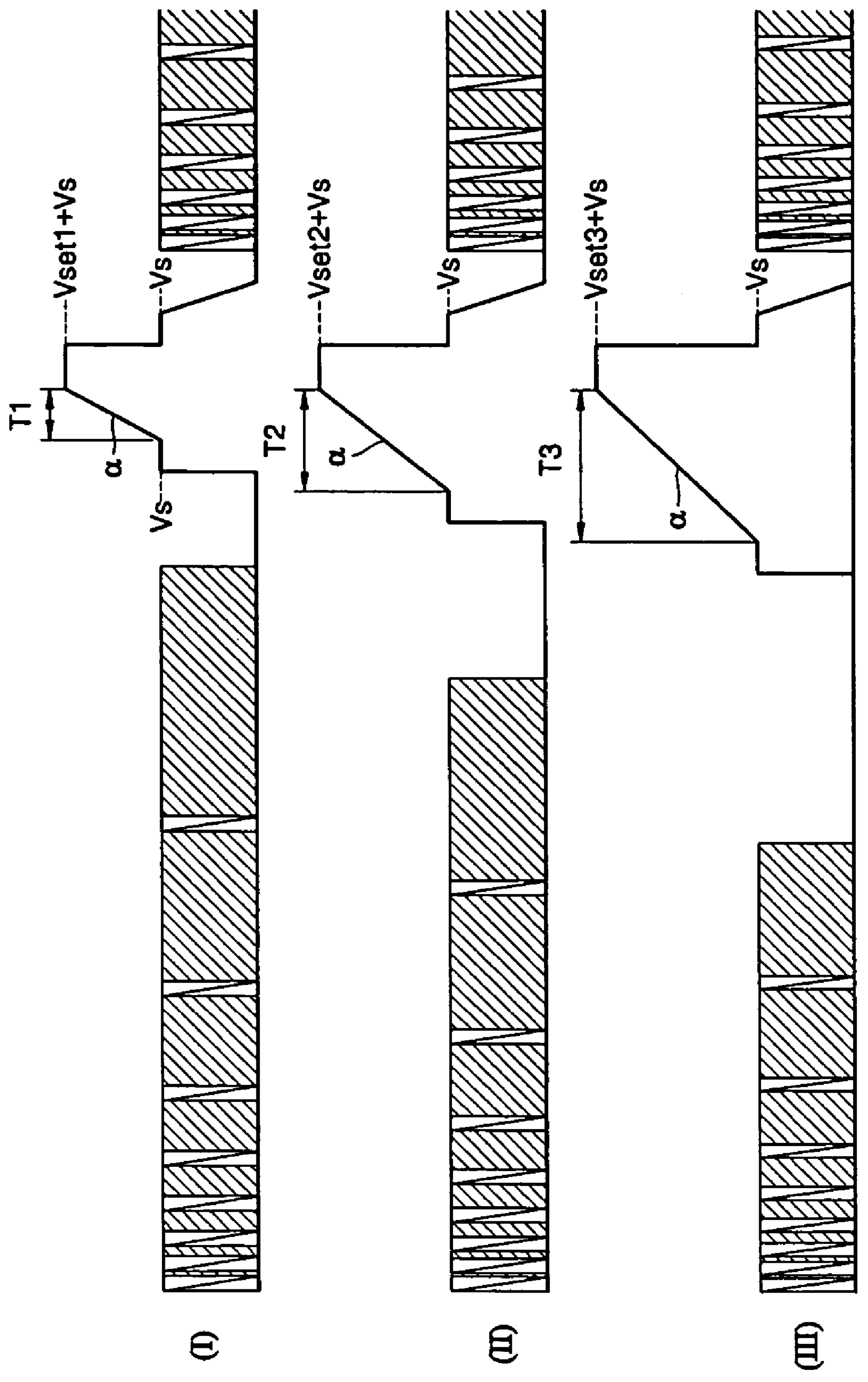
FIG. 11 a view of an example where the ramp slope is fixed and the ramp period or ramp voltage is varied during the reset period according to the length of the pause period in the TV field of FIG. 7.

FIG. 11 is a view of an example where the ramp slope is fixed and the ramp period or ramp voltage is varied during the reset period according to the length of the pause period in the TV field of FIG. 7.

Referring to FIG. 11, the length of the pause period in the single TV field varied according to APC steps of FIG. 7. The number of subfields can be increased or decreased if necessary. Thus, the length of the pause period can be varied according to not only a variation of APC steps but also to a variation of the number of subfields in the same concept as shown in FIG. 7. The present invention supplies a variable reset pulse according to the length of the pause period in one TV field.

As a length of the pause period in a single TV field increases, the number of wall charges decreases. Thus, the ramp risetime Tr or ramp voltage Vset can be increased to generate a write discharge for initialization.

Referring to FIG. 11, example I had the shortest pause period, and example III had the longest pause period. Thus, in example III, the ramp risetime Tr3 or the ramp voltage Vset3 needs to be increased.

Figure 12:
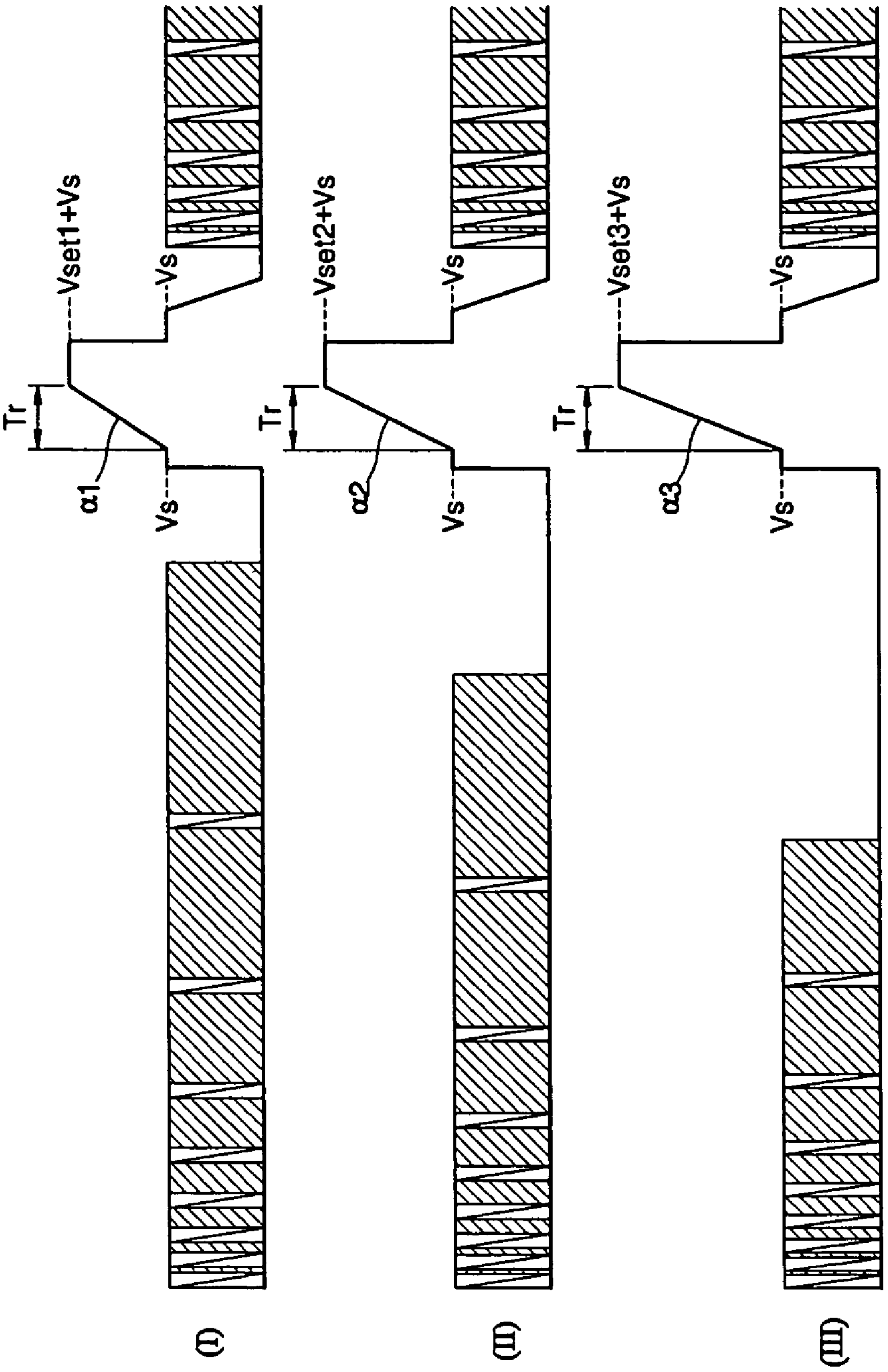
FIG. 12 a view of an example where the ramp rise time is fixed and the ramp slope or ramp voltage is varied according to the length of the pause period in the TV field of FIG. 7.

FIG. 12 is a view of an example where the ramp risetime was fixed and the ramp slope or ramp voltage varied according to the length of the pause period in the TV field of FIG. 7.

Referring to FIG. 12, example I had the shortest pause period, and example III had the longest pause period. Thus, in example III, the ramp slope a3 or the ramp voltage Vset3 needs to be increased.

In driving the electrodes of the PDP, an address period in which a cell for emitting light is selected and a sustain period in which the selected cell emits light occur sequentially. In addition, the panel driving method of present invention can be applied to any display apparatus requiring initialization of cells. For example, it is apparent to those skilled in the art that the present invention can not only be applied to an AC PDP but is also applicable to Direct Current (DC) PDPs, electroluminescence displays (ELD), and liquid crystal displays (LCD), for example.

The present invention can also be embodied as computer readable codes on a computer readable recording medium. The computer readable recording medium is any data storage device that can store programs or data which can be thereafter read by a computer system. Examples of a computer readable recording medium include a Read-only Memory (ROM), a Random-access Memory (RAM), CD-ROMs, magnetic tapes, floppy disks, and optical data storage devices. The programs stored in the recording medium are expressed by a series of instructions that are directly or indirectly used in devices having information processing capability, such as a computer, to obtain specific results. Accordingly, the term "computer" refers to any device including an input unit, an output unit, and an arithmetic unit and has information processing capability for performing specific functions. A panel driving apparatus can be a computer even if it is limited to driving a display panel.

In particular, the panel driving method of the present invention is written by a schematic or Very High Speed Integrated Circuit (VHSIC) Hardware Description Language (VHDL) on a computer, and can be connected to a computer and embodied by a programmable Integrated Circuit (IC), e.g., a Field Programmable Gate Array(FPGA). The recording medium includes such a programmable IC.

As described above, in the panel driving method, a variable reset period is supplied according to the length of a pause period in a single TV field, so that a reset operation for preparing an address period is stably performed.

While the present invention has been particularly shown and described with reference to exemplary embodiments thereof, it will be understood by those of ordinary skill in the art that various changes in form and details can be made therein without departing from the spirit and scope of the present invention as recited in the following claims.

What is claimed is:

1. A panel driving method comprising:

defining one reset period and at least one subfield in a single TV field, each of the at least one subfields including an address period and a sustain period; and generating one variable reset pulse in the reset period according to a pause period length of a previous TV field or a present TV field;

wherein the pause period length of the previous TV field or present TV field is varied according to the number of subfields constituting one TV field.

2. The panel driving method of claim 1, wherein a rising slope of a ramp of the variable reset pulse is varied according to the pause period length of the previous TV field or present TV field.

3. The method of claim 1, wherein a highest ramp voltage of the reset pulse is varied according to the pause period length of the previous TV field or present TV field.

4. The method of claim 1, wherein a ramp period of the reset pulse is varied according to the length of the pause period of the previous TV field or present TV field.

5. A program storage device, readable by a machine, tangibly embodying a program of instructions executable by the machine to perform a panel driving method comprising:

defining one reset period and at least one subfield in a single TV field, each of the at least one subfields including an address period and a sustain period; and generating one variable reset pulse according to a pause period length of a previous TV field or a present TV field;

wherein the pause period length of the previous TV field or present TV field is varied according to the number of subfields constituting one TV field.

6. The program storage device of claim 5, wherein a rising slope of a ramp of the variable reset pulse is varied according to the pause period length of the previous TV field or present TV field.

7. The program storage device of claim 5, wherein a highest ramp voltage of the reset pulse is varied according to the pause period length of the previous TV field or present TV field.

8. The program storage device of claim 5, wherein a ramp period of the reset pulse is varied according to the length of the pause period of the previous TV field or present TV field.

* * * * *